US010436995B2

(12) United States Patent
Ernst et al.

(10) Patent No.: US 10,436,995 B2
(45) Date of Patent: Oct. 8, 2019

(54) CABLE AND METHOD FOR THE PRODUCTION THEREOF

(71) Applicant: LEONI KABEL GMBH, Nuremberg (DE)

(72) Inventors: Christian Ernst, Weissenburg (DE); Sebastian Goss, Roth (DE)

(73) Assignee: LEONI Kabel GmbH, Nuremberg (DE)

( * ) Notice: Subject to any disclaimer, the term of this patent is extended or adjusted under 35 U.S.C. 154(b) by 0 days.

(21) Appl. No.: 15/356,897

(22) Filed: Nov. 21, 2016

(65) Prior Publication Data

US 2017/0146761 A1    May 25, 2017

(30) Foreign Application Priority Data

Nov. 20, 2015   (DE) .......................... 10 2015 223 005

(51) Int. Cl.
| | | |
|---|---|---|
| *G02B 6/44* | (2006.01) | |
| *H01B 7/18* | (2006.01) | |
| *H01B 7/295* | (2006.01) | |

(52) U.S. Cl.
CPC ......... *G02B 6/4436* (2013.01); *G02B 6/4483* (2013.01); *G02B 6/4486* (2013.01); *H01B 7/185* (2013.01); *H01B 7/295* (2013.01); *G02B 6/4429* (2013.01)

(58) Field of Classification Search
CPC .............................. G02B 6/4492; G02B 6/4429
See application file for complete search history.

(56) References Cited

U.S. PATENT DOCUMENTS

| 5,042,904 A | 8/1991 | Story et al. | |
|---|---|---|---|
| 6,236,791 B1 * | 5/2001 | Lausch | G02B 6/4436 385/109 |
| 6,278,826 B1 * | 8/2001 | Sheu | G02B 6/4494 385/109 |
| 6,496,627 B1 * | 12/2002 | Tuminaro | C03C 25/607 385/102 |

(Continued)

FOREIGN PATENT DOCUMENTS

| CN | 102280167 A | 12/2011 |
|---|---|---|
| CN | 103492434 A | 1/2014 |

(Continued)

OTHER PUBLICATIONS

Anonymous, "All plastics protective sheathing arrangement", Mason Publications, Hamsphire, GB, Feb. 1973 (Feb. 1973), p. 14, XP002081694, ISSN: 0374-4353.

*Primary Examiner* — Eric Wong
(74) *Attorney, Agent, or Firm* — Laurence A. Greenberg; Werner H. Stemer; Ralph E. Locher (57) ABSTRACT

A cable, which extends in a longitudinal direction, has a cable core and a cable jacket. The cable jacket is extruded around the cable core. The cable is distinguished by the fact that the cable jacket has a plurality of chambers and, overall, is designed, in particular, in the manner of a hollow profile, and by the fact that a functional material different from the material of the cable jacket is introduced within at least one of the chambers. The functional material is preferably a flame proofing agent, but numerous other materials and, in general, functional elements are also conceivable. We further describe a method for producing the cable.

22 Claims, 3 Drawing Sheets

(56) References Cited

U.S. PATENT DOCUMENTS

| | | | |
|---|---|---|---|
| 6,894,101 B2 | 5/2005 | Paul et al. | |
| 7,376,315 B2* | 5/2008 | Kurosawa | G02B 6/02347 |
| | | | 385/123 |
| 7,511,225 B2 | 3/2009 | Wiekhorst et al. | |
| 8,452,142 B1* | 5/2013 | Laws | G02B 6/4416 |
| | | | 385/101 |
| 8,983,255 B2* | 3/2015 | Shinji | A61B 1/00167 |
| | | | 385/109 |
| 9,349,500 B2* | 5/2016 | Koemmelt | H01B 3/447 |
| 9,377,598 B2* | 6/2016 | Dowd | G02B 6/4492 |
| 9,415,551 B2* | 8/2016 | Gimblet | G02B 6/02395 |
| 9,459,423 B2* | 10/2016 | Gallo | G02B 6/4436 |
| 2002/0017390 A1 | 2/2002 | Gregor et al. | |
| 2014/0150710 A1* | 6/2014 | Jones | G01N 31/22 |
| | | | 116/206 |
| 2014/0272115 A1 | 9/2014 | Shaffer et al. | |
| 2015/0131952 A1* | 5/2015 | Gallo | G02B 6/4436 |
| | | | 385/102 |

FOREIGN PATENT DOCUMENTS

| | | |
|---|---|---|
| CN | 204558117 U | 8/2015 |
| CN | 204792051 U | 11/2015 |
| DE | 2022802 A | 11/1971 |
| DE | 2811526 A1 | 9/1978 |
| DE | 19949167 A1 | 4/2001 |
| DE | 10035647 A1 | 1/2002 |
| DE | 29724610 U1 | 4/2002 |
| EP | 1081720 A1 | 3/2001 |
| EP | 1179824 A2 | 2/2002 |
| FR | 2091363 A5 | 1/1972 |
| GB | 1563685 A | 3/1978 |

* cited by examiner

CABLE AND METHOD FOR THE PRODUCTION THEREOF

BACKGROUND OF INVENTION

Field of Invention

The invention relates to a cable, which extends in a longitudinal direction, having a cable core and having a cable jacket, which is extruded around the cable core. The invention furthermore relates to a method for producing the cable.

A cable is described in US 2014/0272115 A1, for example.

In operation, cables are subject to certain requirements and, for example, must meet certain fire protection requirements. For this purpose, a corresponding cable is typically designed as a flameproofed or fireproofed cable and is provided with a flameproofing agent.

In US 2014/0272115 A1, for example, a description is given of a cable, to the cable jacket of which a liquid coating is applied, which contains a flame-retardant material, i.e. a flameproofing material.

BRIEF SUMMARY OF THE INVENTION

Taking this as a starting point, it is an object of the invention to indicate an improved cable with an additional functionality, in particular flameproofing. The cable should be as simple as possible to manufacture and as simple as possible to handle. The intention is furthermore to indicate a production method for the cable.

According to the invention, the object is achieved by a cable having the features as claimed and by a method having the features as claimed. Advantageous embodiments, developments and variants form the subject matter of the dependent claims. Here, the statements in connection with the cable also apply mutatis mutandis to the method and vice versa.

The cable extends in a longitudinal direction and has a cable core and a cable jacket, which is extruded around the cable core. According to the invention, the cable jacket has a number of chambers and a functional material different from the material of the cable jacket is introduced within at least one of the chambers.

One special advantage of the invention is, in particular, that, depending on requirements, it is possible to integrate materials into the cable without these having to be applied externally to the latter, for example. Such materials, also referred to as functional materials, are introduced into at least one or into some, preferably into all, of the chambers formed. In particular, the cable jacket forms an outer surface and thereby delimits the cable with respect to the environment thereof. Through a suitable choice of the material for the cable jacket, the mechanical properties of the cable, in particular, can then be set in an optimum manner. Moreover, the cable is simple to handle since the jacket is preferably of correspondingly robust design. In particular, a liquid coating is dispensed with.

In general terms, the cable is preferably a flexible electrical or optical transmission element for data or power transmission, which is suitable, in particular, for loose, i.e. nonrigid, laying. The flexible cable can usually be laid without damage along tight bending radii corresponding to no more than about 100 times the diameter of the cable, for example. Possible bending radii of typical cables are thus less than 1 m, for example. More specifically, the bending radius for a particular cable is obtained from a standard that applies in this context, primarily in accordance with the specific use of the cable.

The cable is therefore particularly versatile in terms of the additional functions with which it can be provided, simply by introducing a functional material suitable for the respective additional function. This can also be a functional element which is pre-produced and/or in the form of a strand, for example.

According to a first preferred variant, the introduction of the functional material takes place during the extrusion of the cable jacket by means of an extrusion head as part of an online method. As an alternative, the functional material is introduced only later, i.e. in an off-line method and not by means of the extrusion head. With the off-line method, it is possible, in particular, to add particularly heat sensitive materials or additional elements only after extrusion, when the cable jacket has cooled. In one variant, the cable is therefore used as a semifinished product with unfilled chambers formed as hollow chambers, and is only later provided with an additional function, in particular any desired additional function, in accordance with what is needed and according to requirements.

However, there is a particular preference for an online method in which, although the functional material is supplied via the extrusion head, it is initially conveyed onward via capillaries in such a way as to be thermally separate from said head and emerges from the capillaries and enters the chambers only at a certain distance after the extrusion head in the delivery direction. Starting from the extrusion head, the capillaries thus extend in the delivery direction and each within one of the chambers. In this way, the capillaries also form a supporting contour for the cable jacket and furthermore advantageously also have a shaping effect on the chambers. The capillaries are designed in a suitable manner such that the functional material delivered therein is thermally insulated from the extrusion head and protected from degradation or decomposition.

The functional material then emerges at an exit point at the end of each capillary into the respective chamber. The position of the exit point, i.e. the abovementioned distance and thus the length of the capillaries, is chosen in such a way that the functional material only enters the chambers at a location at which the cable jacket has cooled sufficiently to avoid exerting a disadvantageous thermal effect on the functional material. In other words: in the delivery direction there is a temperature gradient and the length of the capillaries is chosen so that the functional material is introduced into the chambers at a location at which the prevailing temperature does not degrade or destroy the functional material. Thus, the exit point is expediently located sufficiently far, in the delivery direction, into a water bath or some other cooling device through which the cable is transported after extrusion to cool the cable jacket. Starting from the extrusion head, the capillaries often have a length in the region of several tens of centimeters, e.g. of 30 cm to 100 cm or more, e.g. even several meters.

The cable core, also referred to as the substructure, comprises, in particular, a number of leads and/or wires, e.g. signal wires or data lines. In the simplest case, the cable core is a simple uninsulated conductor, e.g. a stranded wire. In one variant, the cable core comprises an optical transmission line, e.g. a glass fiber, and/or a strain relief device or similar. In another variant, the cable core comprises a shield, e.g. a braided shield or a laminated foil or is surrounded or enclosed overall by such a shield. In principle, therefore, any arrangement of cables, leads and/or wires, with or without functional elements and with or without a jacket is suitable as a cable core. In particular, it is also possible to conceive of a variant in which the cable core comprises a number of tubes for guiding operating or working media or that the cable core itself is such a tube.

The cable jacket is applied directly to the cable core, i.e. the cable core is supplied as a semifinished product to an extrusion head, by means of which the material of the cable jacket is extruded onto the cable core. The chambers are simultaneously formed during this process. For this purpose, the extrusion head is of a correspondingly suitable design.

In a preferred variant, at least one of the chambers, preferably all the chambers, is/are filled during the process of extrusion itself, by supplying the extrusion head with the corresponding material or a functional element.

By virtue of the capillaries used, a sufficient supporting effect is initially ensured up to the cooling of the cable jacket. Particularly if no capillaries are used, it is expedient if the cable is transferred to a sizing unit after extrusion in order to monitor and set the outer contour of the cable, in particular a circular cross section of defined diameter. In this case, the cable jacket is normally subject to suction in the sizing unit in order to avoid collapse of the cable jacket before cooling and setting. At the same time, in particular, the outside diameter of the cable is checked. The use of a sizing unit is also possible in the preferred production method involving downstream filling of the chambers via capillaries, in particular to ensure a defined outer contour. However, it is expedient to dispense with a sizing unit during this process.

In one possible variant, e.g. in the context of the above-mentioned off-line method, unfilled hollow chambers are formed as the chambers by supplying air or, more generally, a supporting medium to the extrusion head to ensure that the chambers do not collapse. As an alternative or in addition, the use of a sizing unit is also appropriate. A certain material is then introduced subsequently into the chambers.

Overall, the cable jacket is therefore designed, in particular, in the manner of a (hollow) profile with a number of (profile) chambers which extend in the longitudinal direction, in particular without interruption, and offer space for the integration of additional functions. The cable jacket is preferably manufactured integrally or in one piece, that is to say, in particular, as a coherent structure and from just one material, in particular just one production material, and is not assembled from separately manufactured parts, for instance.

In principle, any cross-sectional geometries and arrangements of the cable core relative to the cable jacket are possible by means of the method. In a particularly simple embodiment, however, the cable core is arranged centrally and transversely to the longitudinal direction in cross section, and a number of openings, via which the chambers are accessible, is introduced into the cable jacket around said core. In a preferred variant, the cable jacket is furthermore embodied in such a way as to be free from holes leading to the outside, i.e. it does not have any openings in a radial direction, with the result that the chambers are then accessible only at the ends in the longitudinal direction and are otherwise closed off. In a particularly simple variant, the cable jacket is furthermore preferably of rotationally symmetrical design, at least insofar as the cable jacket is, in particular, round and the chambers are of similar design.

A particular chamber has a cross-sectional area in a range of from 0.1 to 100 $mm^2$ or even more, for example, depending on the specific embodiment and specific purpose of the cable. In principle, any cross-sectional geometry for the chambers is conceivable, e.g. circular, elliptical or polygonal. Owing to the chambers, an inner and an outer jacket section, in particular, are then formed in the cable jacket. At least the outer jacket section is of continuous design, i.e. the chambers do not extend in a radial direction into the outer jacket section but instead are arranged in an intermediate central jacket section and are delimited by the outer jacket section. In particular, the outer jacket section forms an outer surface of the overall cable. In particular, the inner jacket section rests on the cable core. In a first variant, the inner jacket section is of continuous design, like the outer jacket section. In a second variant, on the other hand, the inner jacket section is interrupted, and therefore the chambers extend through the latter and as far as the cable core. In particular, the two jacket sections are connected to one another via webs, which extend substantially in a radial direction and delimit the chambers with respect to one another. In one variant, there is no inner jacket section, with the result that the chambers and the webs start directly at the cable core and are delimited on the inside by the latter. The inner and the outer jacket section each have a wall thickness in a range of from 0.05 to 20 mm, for example. The webs each have a wall thickness in a range of from 0.01 to 10 mm, for example. In particular, the wall thickness of the webs also corresponds to a distance between the chambers, i.e. a chamber spacing.

In a particularly preferred embodiment, a flameproofing agent, in particular a solid flameproofing agent, is arranged within at least one of the chambers. In other words: the chamber is completely or at least partially filled with a flameproofing agent and, in particular, is not merely coated. The flameproofing agent is preferably arranged in all the chambers. This is a structurally simple way of forming a flame-resistant or flameproofed cable in which, on the one hand, the cable core is surrounded in an optimum manner by flameproofing agent and, on the other hand, the overall structure is protected, in particular mechanically protected, from the outside by the cable jacket. Here, "solid" is taken to mean, in particular, that the flameproofing agent has a viscosity which is at least such that the flameproofing agent does not run out when the cable is severed. The viscosity or solidity required for this purpose is dependent especially on the cross-sectional area of a particular chamber.

Normally, the flameproofing agent is based on a powdered solid as a starting material or flameproofing material, which is expediently mixed with a liquid or gel-type process material for better processability, in particular pumpability. A suitable starting material for the flameproofing agent is ATH, i.e. aluminum hydroxide, for example, which is particularly inexpensive. In principle, however, AOH, i.e. aluminum oxide hydroxide, or MDH, i.e. magnesium hydroxide, are also suitable, for example. It is advantageous if the process material itself is already at least a fire retardant. In this context, silicone oil is particularly suitable as a process material. The respective starting material is then mixed with the process material in a manner suitable for processing.

The use of a cross-linkable process material, which initially leads to a liquid or gel-type flameproofing agent, which is cross-linked and thereby set after the production of the cable or at least after the filling of the chambers, is particularly advantageous. In the finished cable, the process material is present in cross-linked form and then serves, as it were, as a matrix for the flameproofing material. On the one hand, this ensures that the flameproofing agent is easy to process during production, in particular being pumpable through the capillaries, and, on the other hand, the flameproofing agent is advantageously prevented from running out of the finished cable during assembly. Here too, silicone oil is suitable, being cross-linkable, so that, in particular, the viscosity thereof can be set. Thus, overall, the process material is used to form the solid flameproofing agent, and, here too, what has been stated above applies to the term "solid".

In particular the abovementioned possibility of integrating the flameproofing agent at a later point in time considerably increases the selection of materials for the production of the cable jacket. This is based on the consideration that the flameproofing agent, in particular the flameproofing material, has a decomposition temperature which must usually be higher than a processing temperature of the cable jacket, more precisely of a material for the production of the cable jacket. However, extrusion at a certain processing temperature severely restricts the introduction or integration of a flameproofing agent during production, namely particularly to those flameproofing agents which are still resistant to the corresponding processing temperature. However, this often conflicts with the fact that decomposition of the flameproofing agent above a certain temperature is desired in order to achieve a flame-retardant or flame-resistant effect due to the reaction which then occurs. By virtue of the fact that the flameproofing agent is introduced into the chambers only at a later stage, it is then possible also to use flameproofing agents which react even at low temperatures and, at the same time, to combine these with an optimum material for the cable jacket. In a preferred embodiment, therefore, the cable jacket is manufactured from a material which has a processing temperature that is higher than the decomposition temperature. Here, "processing temperature" is taken to mean, in particular, a minimum processing temperature required to liquefy the material sufficiently for extrusion.

A particularly suitable combination of materials is polypropylene, or PP for short, as a material for the cable jacket and ATH as a flameproofing agent or as a basis for the latter. ATH has a decomposition temperature of about 190° C., whereas PP is generally processed at temperatures well above 190° C. PP is particularly inexpensive and robust, and ATH is likewise particularly inexpensive, as is therefore also the entire cable. Another suitable combination of materials is polyamide, or PA for short, as a material for the cable jacket and MHO as a flameproofing agent or as a basis for the latter.

As already mentioned, the use of inexpensive ATH is made possible by the special cable, in which the integration of the flameproofing agent is possible at a later point in time and is decoupled from the extrusion of the cable jacket. In the cable presented here, the cable jacket is then expediently first of all cooled after extrusion, and at least one of the chambers, preferably all the chambers, are then filled with the flameproofing agent, particularly preferably with ATH, which is mixed with a process material, preferably silicone oil, with the result that, in the finished cable, the flameproofing agent contains ATH, which is embedded in the process material.

The chambers are expediently arranged in a uniformly distributed manner in a circumferential direction around the cable core. Particularly in combination with a flameproofing agent, this results in particularly uniform flameproofing. For example, the chambers are arranged along an imaginary circle around the cable core and, at the same time, spaced apart uniformly in a circumferential direction. For example, six chambers are provided, wherein each chamber is arranged at an angle of 60° around the longitudinal axis relative to the adjacent chambers.

It is appropriate if the chambers are formed as ring segments in a cross section transverse to the longitudinal direction. In this embodiment, a particularly large total volume of the chambers is obtained since the circumference around the cable core is exploited to a very great extent. Only the webs between the jacket sections remain as walls, in particular thin walls, between each pair of adjacent chambers. Maximum flameproofing is then ensured, particularly in combination with a flameproofing agent.

Typically, the cable has two ends. One of the chambers in each case then advantageously extends continuously from one of the ends to the other of the ends, thus forming a chamber that is continuous in the longitudinal direction. A chamber of this kind is particularly easy to equip or fill since all that is necessary is to introduce a material or a functional element at the end of the cable, and it can then be pushed through as far as the other end. A cable with continuous chambers is also suitable, in particular, as continuous stock, which is subsequently cut to length and assembled as required. In principle, however, variants with chambers that are separate in the longitudinal direction are also conceivable. These are then expediently filled already during the extrusion of the cable jacket.

The cable with chambers is also suitable, in particular, for the integration of additional functions other than the flameproofing mentioned above. In this context, a large number of variants is conceivable, in which either all the chambers are equipped in the same way or, alternatively, are provided with different materials or functional elements.

In a first suitable variant, a physically activatable material, in particular substance, is arranged as a functional material within at least one of the chambers. Here, "physically activatable" is taken to mean that the material is activated by an external influence and then undergoes a conversion, on the basis of which at least one physical property of the material changes. External influences are, for example, shocks, expansions, bending, certain temperatures, moisture, ultrasound or electromagnetic radiation and, more generally, activation energy. Physical properties are, for example, bending stiffness, state of aggregation, color, volume, transparency or the like.

In a second suitable variant, a shock-absorbing fluid is arranged as a functional material within at least one of the chambers. A mechanically particularly robust cable is thereby formed.

In a third suitable variant, a phase change material is arranged within at least one of the chambers. A phase change material is distinguished, in particular, by the fact that a particularly large amount of energy has to be supplied to or withdrawn from it for a phase change. Such a phase change material is therefore used as a latent heat storage device or heat absorber, for example. A corresponding cable is installed, for example, at potentially warm locations, e.g. in a vehicle, in order to protect the cable core from excessive heating by absorbing heat. During a subsequent service, it is then possible, in particular, for the phase change material to be regenerated. A phase change material is also suitable in the context of flameproofing for protecting the cable core from heating, at least over a certain period of time.

In a fourth suitable variant, a repair material, in particular a liquid repair material, is arranged within at least one of the chambers to form a self-healing cable. The repair material is distinguished by the fact that it escapes from the chamber, for example, when the cable jacket is damaged and covers or fills the damage. For this purpose, the repair material reacts with air or with moisture in the air, for example, and then hardens, for example. It is also conceivable for the repair material to penetrate automatically into cracks in the cable jacket and to close them again.

In principle, the use of air or, more generally, a simple supporting gas or filling gas instead of the functional material is also conceivable, making the cable particularly light overall. In the sense according to the present application, air is not included in the concept of the functional material. On the contrary, the term "functional material" denotes a material different from air and, in particular, a liquid, gel-type or solid substance or material.

In a fourth suitable variant, the functional material is designed as a multicomponent system, having at least two different materials, in particular substances or media, which are arranged in different chambers, wherein the materials react with one another upon contact. As a result of the reaction, a filling is formed, which has properties that differ from the materials, e.g. an increased volume, an increased stiffness or strength or a different color. Production or absorption of energy as a result of the reaction is also conceivable.

In the case of a multicomponent system, the chambers are therefore generally filled with at least two different materials, which react with one another, in particular chemically, upon contact. It is thereby advantageously possible to obtain a self expanding cable, for example, the cable jacket of which adapts automatically to a predetermined diameter after the triggering of the reaction, e.g. by crushing, piercing or cutting of the chambers. For example, the cable is passed through a passage in an orifice or wall and then the reaction is started, with the result that the diameter of the cable jacket adapts to the inside diameter of the passage through the expansion of the filling. In this way, a self-healing cable is also formed with a multicomponent material system, wherein the filling then fills and/or covers a damaged location on the cable jacket.

In one variant, sectional reinforcement is obtained by means of the multicomponent system. In this case, by starting the reaction locally in a restricted section, for example, a sectional reinforcement is then formed and the flexibility of the cable selectively reduced by the onset of the reaction.

In another suitable variant of the cable, at least one of the chambers is designed to deliver an operating medium, that is to say that, during the operation of the cable, an operating or working medium, e.g. water, oil or air, is delivered by one of the chambers. This significantly expands the area of application of the cable. For this purpose, the chamber is suitably provided with suitable connection elements at the ends.

As already mentioned, a combination of a plurality of the abovementioned variants and, in general, various materials and/or functional elements is also possible.

Also conceivable is an alternative embodiment of the cable in which the cable core is not arranged in the center but in one of the chambers. In other words: the cable jacket is extruded onto the core in such a way that the cable jacket has a central chamber which is encircled by a number of chambers, wherein the cable core is arranged in one of the chambers. This embodiment is suitable particularly for a cable for delivering an operating or working medium which is then preferably guided in the central chamber since it is significantly easier to provide said central chamber with a connection element, which is therefore also connected in a suitable manner.

BRIEF DESCRIPTION OF THE SEVERAL VIEWS OF THE DRAWING

Illustrative embodiments of the invention are explained in greater detail below by means of a drawing, in which, of the figures, each of which is schematic.

DESCRIPTION OF THE INVENTION

Figure 1:
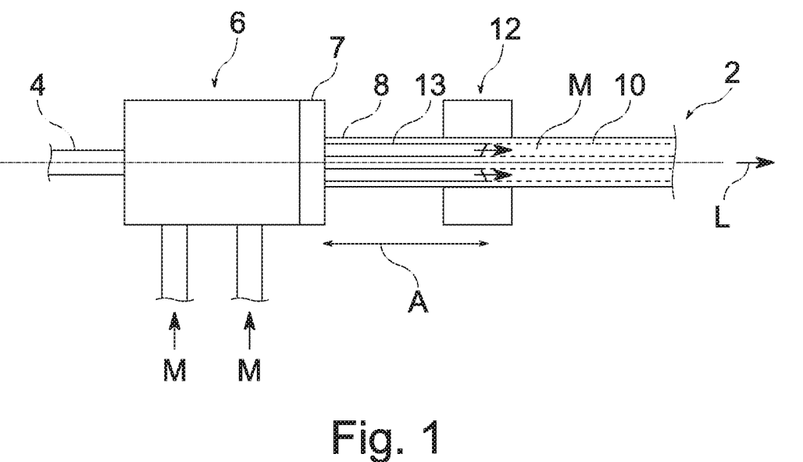
FIG. 1 shows the extrusion of a cable jacket for a cable.
Figure 2A:
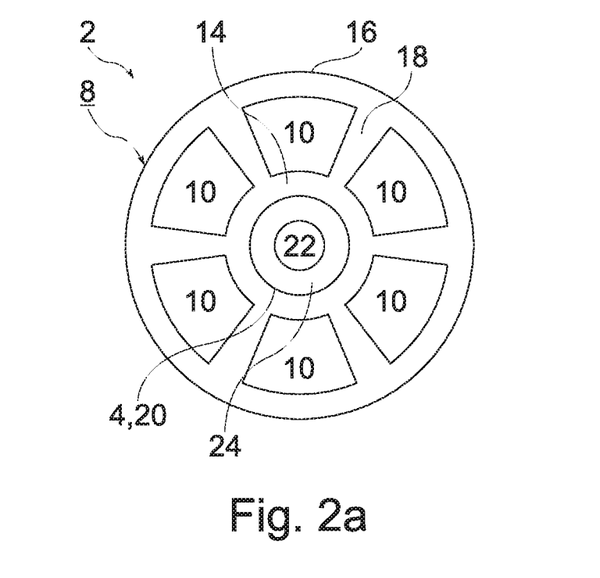
FIGS. 2a-2c each show one variant of the cable in a cross-sectional view.
Figure 2B:
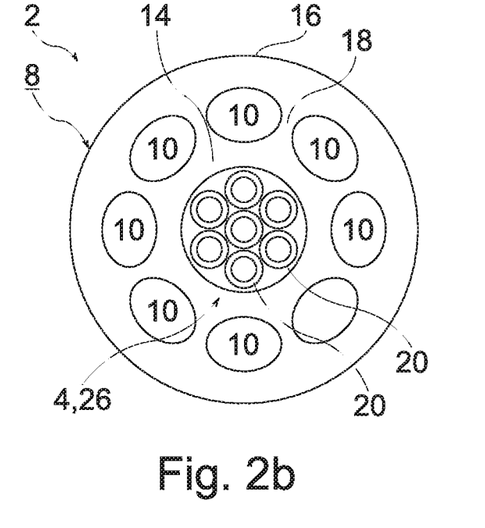
Figure 2C:
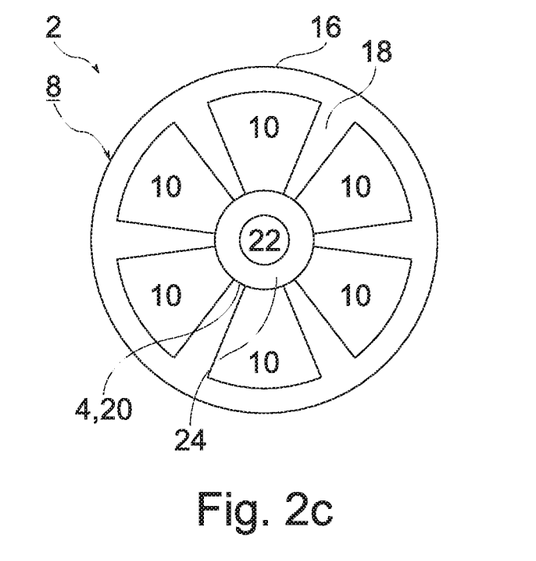

A preferred production method for a cable 2 is shown in highly schematized form in FIG. 1. The cable 2 has a cable core 4, which is fed to an extruder 6 as a semifinished product and, in the process, to an extrusion head 7. By means of said extrusion head, a cable jacket 8, made from polypropylene for example, is extruded onto the cable core 4. Three illustrative embodiments of the cable 2 are shown in FIGS. 2a to 2c, in each case in a cross-sectional view. There, it can be seen, first of all, that the cable jacket 8 has a number of chambers 10, which extend in a longitudinal direction L along the cable 2 and are furthermore of continuous design here. After the extrusion head 7, the cable 2 is transferred to a water bath 12 for cooling. In a variant which is not shown, the cable 2 is alternatively or additionally passed through a sizing unit, which ensures that the chambers 10 do not collapse during subsequent cooling and that the cable jacket 8 maintains the envisaged shape.

In FIG. 1, the chambers 10 are filled with a functional material M shortly after the extrusion of the cable jacket 8. This material is fed directly to the extrusion head 7. The extrusion head 7 furthermore has a number of capillaries 13, which extend in the delivery direction, i.e. in longitudinal direction L, and serve as a supporting contour for the chambers 10. At the same time, the capillaries 13 have a shaping effect. The functional material M is then first of all passed through the capillaries 13 and is introduced into the chambers 10 from the capillaries 13 only at a distance A after the extrusion head 7 in the delivery direction. At this point, the cable jacket 8 has cooled down sufficiently, and therefore the functional material M does not run the risk of decomposition.

As an alternative, air or some other supporting medium is used first of all and then, in particular after cooling, the chambers 10 are filled with a functional material M. In this variant, which is not shown, a cable 2 formed with hollow chambers is therefore formed as an intermediate. In principle, this can also be used as an end product. In a variant which is not shown, the chambers 10 are alternatively or additionally equipped with a pre-produced functional element.

In the variant shown in FIG. 2a, the cable has a plurality of chambers 10 in the form of ring segments, which are arranged uniformly in a circumferential direction around the cable core 4 in the cable jacket 8. Toward the cable core 4, the chambers 10 in FIGS. 2a and 2b are delimited by an inner jacket section 14 and, toward the outside, they are delimited by an outer jacket section 16 and, with respect to one another, are delimited by webs 18. In the illustrative embodiment in FIG. 2c, however, an inner jacket section 14 is lacking, and therefore the webs 18 and the chambers 10 extend as far as the cable core 4.

The chambers 10 are preferably filled with a flameproofing agent M. In principle, however, there are numerous possibilities in the selection of the equipment or filling of the chambers 10. As an alternative or in addition, the material M is, for example, a shock absorbing fluid, a light-transmitting material, e.g. as a functional element in the form of an optical fiber, a phase change material or a repair material.

In FIG. 2a, the cable core 4 is a simple wire 20, having a conductor 22 surrounded by insulation 24.

In the variant shown in FIG. 2b, the cable 2 likewise has a plurality of uniformly distributed chambers 10, but these are shaped elliptically here. Here, the cable core 4 is a line 26 comprising a plurality of wires 20.

Figure 3A:
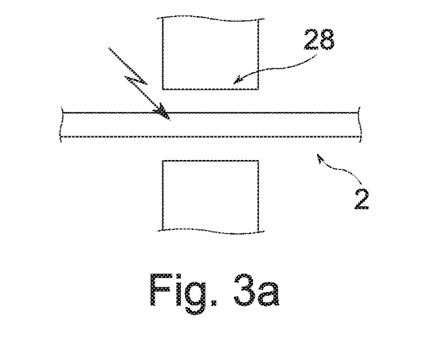
FIGS. 3a, 3b show a cable with an expanding or expanded filling.
Figure 3B:
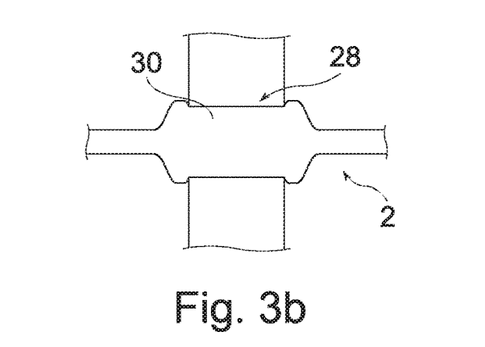
Figure 3C:
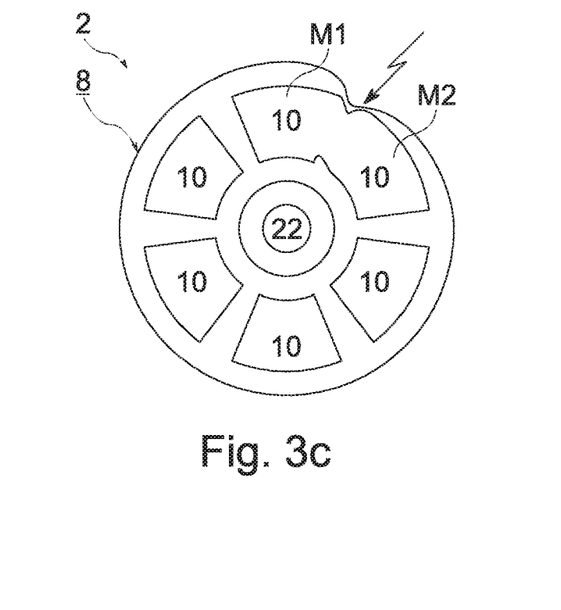
FIG. 3c shows the cable from FIG. 3a in a cross-sectional view.

FIGS. 3a and 3b show a variant of the cable 2 in a side view, in which two different materials M1, M2, which form an expanding filling in a mixing operation, are arranged in the chambers 10. In FIG. 3a, the cable 2 is first of all passed with clearance through a passage 28. The cable jacket 8 is then cut or pierced slightly as illustrated, for example, or, as shown in the cross-sectional view in FIG. 3c, slightly compressed, with the result that the web 18 between two chambers 10 is destroyed and the two materials M1, M2 in the adjacent chambers 10 are mixed, chemically react and finally form the expanding filling. This then has the effect that a thickened portion 30 in the form of an enlarged throat is formed on the cable 2, as shown in FIG. 3b. The passage 28 is then closed in an optimum manner and the cable 2 is seated with optimum sealing in the passage 28.

LIST OF REFERENCE SIGNS 2 cable
4 cable core
6 extruder
7 extrusion head
8 cable jacket
10 chamber
12 sizing unit
14 inner jacket section
16 outer jacket section
18 web
20 wire
22 conductor
24 insulation
26 line
27 passage
30 thickened portion
A distance
L longitudinal direction
M functional material
M1, M2 material

The invention claimed is:

1. A cable that extends in a longitudinal direction, the cable comprising:
a cable core;
a cable jacket extruded around said cable core, said cable jacket having a plurality of chambers formed therein; and
a functional material different from a material of said cable jacket disposed within at least one of said chambers;
wherein said functional material is a multi component system having at least two different materials, wherein said different materials are arranged in different chambers of said plurality of chambers and said different materials are materials that react with one another upon contact to form a filling with at least one property differing from a corresponding property of each of said different materials.

2. The cable according to claim 1, wherein said different materials are configured to produce said filling as an expanding filling upon reacting with one another.

3. The cable according to claim 1, wherein at least one of said chambers is configured to transport an operating medium.

4. A method for producing a cable, the method comprising:
providing a cable core;
extruding a cable jacket onto the cable core, and forming the jacket with a plurality of chambers; and
completely filling at least some of the plurality chambers with a functional material during or after the extruding step, to thereby form a cable according to claim 1;
wherein said functional material is a flame proofing agent; and
wherein said functional material is a multi component system having at least two different materials, wherein said different materials are arranged in different chambers of said plurality of chambers and said different materials are materials that react with one another upon contact to form a filling with at least one property differing from a corresponding property of each of said different materials.

5. The method according to claim 4, which comprises:
cooling the cable after extruding the cable jacket, and, during the cooling process, filling at least one of the chambers or all of the chambers, with the functional material being a flame proofing agent.

6. The method according to claim 5, which comprises cross-linking the flame proofing agent after the step of filling the chamber or the chambers.

7. The method according to claim 5, wherein the cable jacket is manufactured from a material which is processed at a given processing temperature, and wherein the flame proofing agent has a decomposition temperature which is lower than the given processing temperature.

8. The cable according to claim 1, wherein at least one of said at least two different materials is a flame proofing agent disposed within and completely filling at least one of said different chambers.

9. The cable according to claim 1, wherein all of said plurality of chambers of said cable jacket are completely filled with said functional material.

10. The cable according to claim 1, wherein said flame proofing agent is composed of a pulverulent solid and of a process material.

11. The cable according to claim 10, wherein said process material is cross-linked to render said flame proofing agent a solid flame proofing agent.

12. The cable according to claim 1, wherein said flame proofing agent has a given decomposition temperature and said cable jacket is formed of a material which has a processing temperature that is higher than the decomposition temperature.

13. The cable according to claim 1, wherein said flame proofing agent comprises aluminum hydroxide embedded in a process material, and said cable jacket is manufactured from polypropylene.

14. The cable according to claim 1, wherein said chambers are uniformly distributed in a circumferential direction about said cable core.

15. The cable according to claim 1, wherein said chambers are formed as ring segments in a cross section transverse to the longitudinal direction of the cable.

16. The cable according to claim 1, wherein the cable is formed with a first end and a second end and each of said chambers extends continuously from said first end to said second end.

17. The cable according to claim 1, wherein said functional material is a physically activatable material arranged within said at least one of said chambers.

18. The cable according to claim 1, wherein said functional material is a shock-absorbing fluid arranged within said at least one of said chambers.

19. The cable according to claim 1, wherein said functional material is a phase change material arranged within said at least one of said chambers.

20. The cable according to claim 1, wherein said functional material is a repair material arranged within said at least one of said chambers to form a self-healing cable.

21. The cable according to claim 1, wherein said different materials react with one another upon contact by chemically reacting with one another upon contact.

22. The method according to claim 4, wherein said different materials react with one another upon contact by chemically reacting with one another upon contact.

* * * * *